Figure 1:
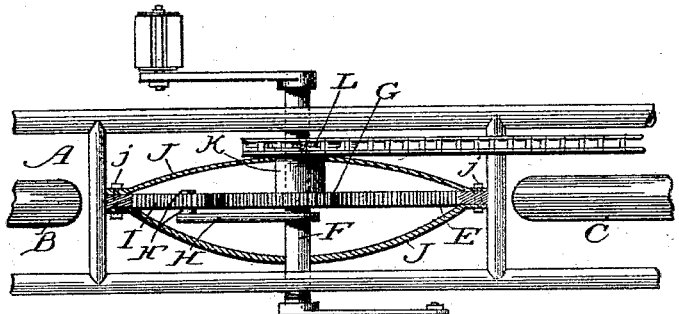

(No Model.)

J. FORREST.
BICYCLE.

No. 531,918. Patented Jan. 1, 1895.

Witnesses
J. W. Reynolds
L. G. Randall

Inventor
James Forrest.
By John Wedderburn
Attorney

UNITED STATES PATENT OFFICE.

JAMES FORREST, OF MEDICAL LAKE, WASHINGTON.

BICYCLE.

SPECIFICATION forming part of Letters Patent No. 531,918, dated January 1, 1895.

Application filed July 5, 1894. Serial No. 516,585. (No model.)

*To all whom it may concern:*

Be it known that I, JAMES FORREST, a citizen of the United States, residing at Medical Lake, in the county of Spokane and State of Washington, have invented certain new and useful Improvements in Bicycles; and I do hereby declare the following to be a full, clear, and exact description of the invention, such as will enable others skilled in the art to which it appertains to make and use the same.

This invention relates to certain new and useful improvements in bicycles and more particularly to the driving gear thereof, and it has for its objects among others to provide simple and efficient means whereby the speed of the wheel may be materially increased.

The device is simple, easily applied, requires no attention on the part of the rider, and is not liable to get out of order.

Other objects and advantages of the invention will hereinafter appear and the novel features thereof will be specifically defined by the appended claim.

The invention in this instance resides in the peculiar combinations, and the construction, arrangement and adaptation of parts, all as more fully hereinafter described, shown in the drawings and then particularly pointed out in the claims.

The invention is clearly illustrated in the accompanying drawings, which, with the letters of reference marked thereon, form a part of this specification, and in which—

Figure 2:
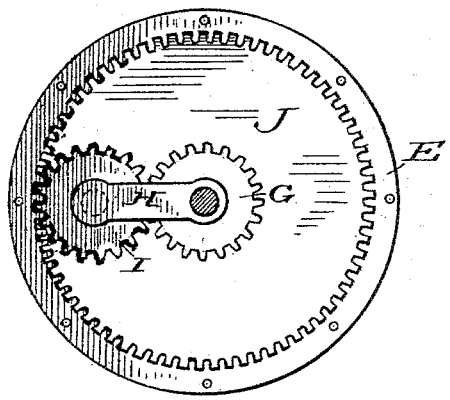
Figure 3:
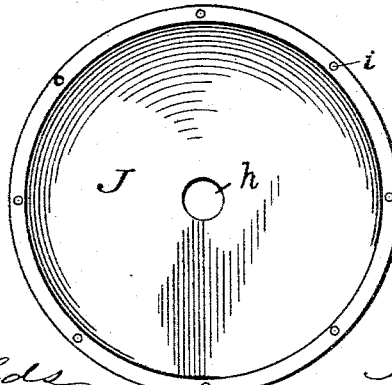

Figure 1 is an elevation of a portion of a bicycle showing the invention applied thereto. Fig. 2 is a detail, of the gear mechanism with the head or outer disk removed. Fig. 3 is a view of the outer disk or head.

Like letters of reference indicate like parts throughout the several views.

Referring now to the drawings A designates a portion of the frame of a bicycle of any suitable construction.

B is the front wheel.

C is the rear wheel.

E is an internally geared ring which is secured to the frame of the machine in any suitable manner.

F is the crank shaft mounted in the usual manner and provided with the cranks and pedals of any well known or approved construction. On this shaft is loosely mounted a small gear G, and fastened to the crank shaft is an arm H which carries at its outer end the gear I which meshes with the internal gear and with the gear G as shown best in Fig. 2. Power may be conveyed from the crank shaft to the rear wheel in any suitable manner, either by intermeshing or other gears, or by sprocket wheels and chain. This manner of connecting up the pedal shaft and rear wheel however forms no part of the present invention.

The gear I carried by the arm H is mounted upon a wrist pin H' on the outer end of said arm as shown in Fig. 1.

The gears are inclosed by means of the removable heads or disks J which are removably attached to opposite sides of the internally geared ring as shown in Fig. 1, in this instance being shown as secured by the screws *j*, the disks and ring being provided with openings *i* for the reception thereof and the disks with central openings *h* for the passage of the crank shaft. These disks are dished as shown to better provide space for the proper working of the gears.

As shown in Fig. 1 the gear G is fast to a sleeve K on the crank shaft and upon the other end of this sleeve is a sprocket wheel L over which may pass the sprocket chain for conveying power to the rear wheel.

By changing the relative proportions of the gears the speed may be increased proportionately.

What is claimed as new is—

In a bicycle or similar vehicle, the combination of an internally toothed ring fixedly attached to the frame thereof, a pedal shaft concentric with the said ring and provided between its ends with an arm carrying at its outer end a wrist pin, a pinion loosely mounted upon the wrist pin and meshing with the teeth of the said ring, a second pinion loosely mounted upon the pedal shaft and in mesh with the pinion on the wrist pin, a sprocket wheel connected to revolve with the pinion mounted upon the pedal shaft, and dished plates secured to the opposite sides of the said ring and inclosing the operating parts, substantially as set forth.

In testimony whereof I have signed this specification in the presence of two subscribing witnesses.

JAMES FORREST.

Witnesses:
OTTO BUSCH,
FRITZ THEILMANN.